United States Patent [19]
Tanomura et al.

[11] Patent Number: 5,621,633
[45] Date of Patent: Apr. 15, 1997

[54] APPARATUS FOR CONTROLLING CONVERTER HAVING SELF-ARC-EXTINCTION ELEMENTS

[75] Inventors: Kenichi Tanomura, Fuchu; Yoichi Uemura, Kawasaki, both of Japan

[73] Assignee: Kabushiki Kaisha Toshiba, Kawasaki, Japan

[21] Appl. No.: 429,503

[22] Filed: Apr. 26, 1995

[30] Foreign Application Priority Data

Apr. 27, 1994 [JP] Japan ................................. 6-112072

[51] Int. Cl.$^6$ .................................................. H02H 7/12
[52] U.S. Cl. ............................................................ 363/97
[58] Field of Search ............................ 363/97, 10, 51, 363/54, 58, 98, 28, 17; 323/207; 318/700, 705, 710, 711, 722, 723, 754; 378/110, 112

[56] References Cited

U.S. PATENT DOCUMENTS

| | | | |
|---|---|---|---|
| 3,887,859 | 6/1975 | Hubner | 321/5 |
| 4,686,617 | 8/1987 | Colton | 363/56 |
| 4,736,148 | 4/1988 | Hirata | 318/812 |
| 4,937,727 | 6/1990 | Leonardi | 363/97 |
| 5,371,664 | 12/1994 | Seki | 363/51 |
| 5,416,398 | 5/1995 | Blatter | 318/700 |

*Primary Examiner*—Aditya Krishnan
*Attorney, Agent, or Firm*—Foley & Lardner

[57] ABSTRACT

A converter control apparatus is configured by a converter magnetic deflection quantity calculation portion for detecting an electricity quantity necessary to calculate a magnetic deflection of an iron core in a converter, a system side direct current component correction controller for calculating a reference value of the direct current component of an output voltage of the converter on the basis of the detected electricity quantity, a converter output direct current component calculator for calculating an output voltage direct current component of the converter on the basis of an electricity quantity which is previously detected and necessary to obtain an output voltage direct current of the converter, a converter output voltage direct current correction controller for inducing an electric quantity for correcting the output voltage of the converter on the basis of a difference between the calculated output voltage direct current component and the reference value of the output voltage direct current component, thereby performing a protective countermeasure for an over-current caused by the magnetic deflection of the converter.

9 Claims, 14 Drawing Sheets

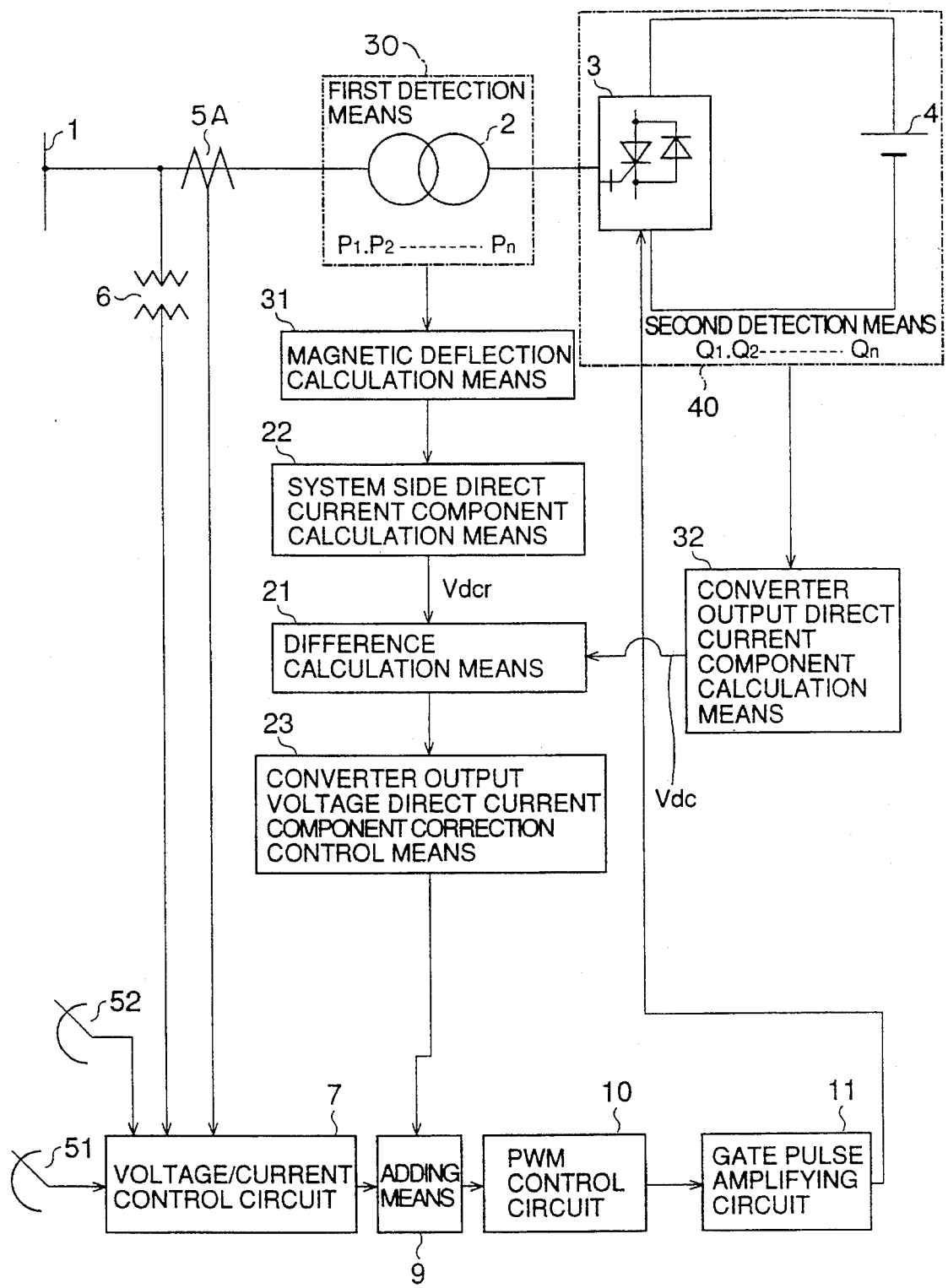
F I G. 2

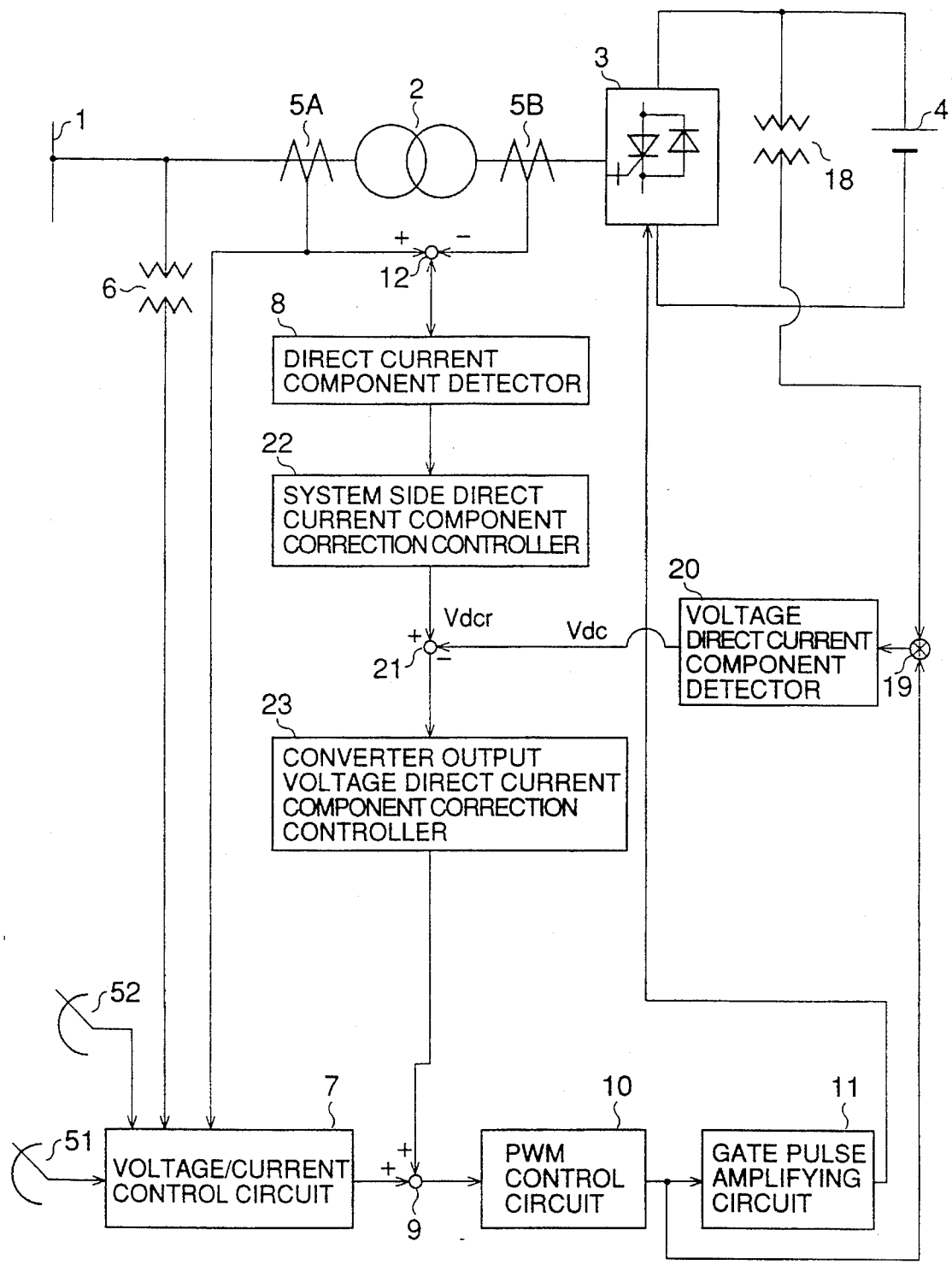
F I G. 3

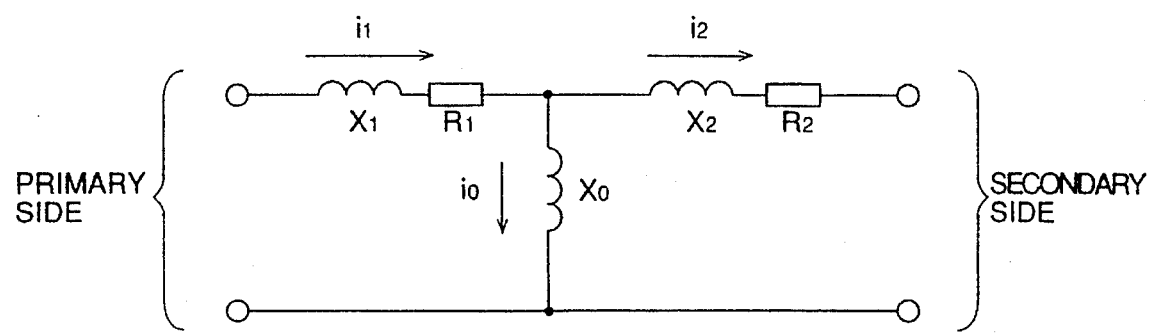
F I G.4

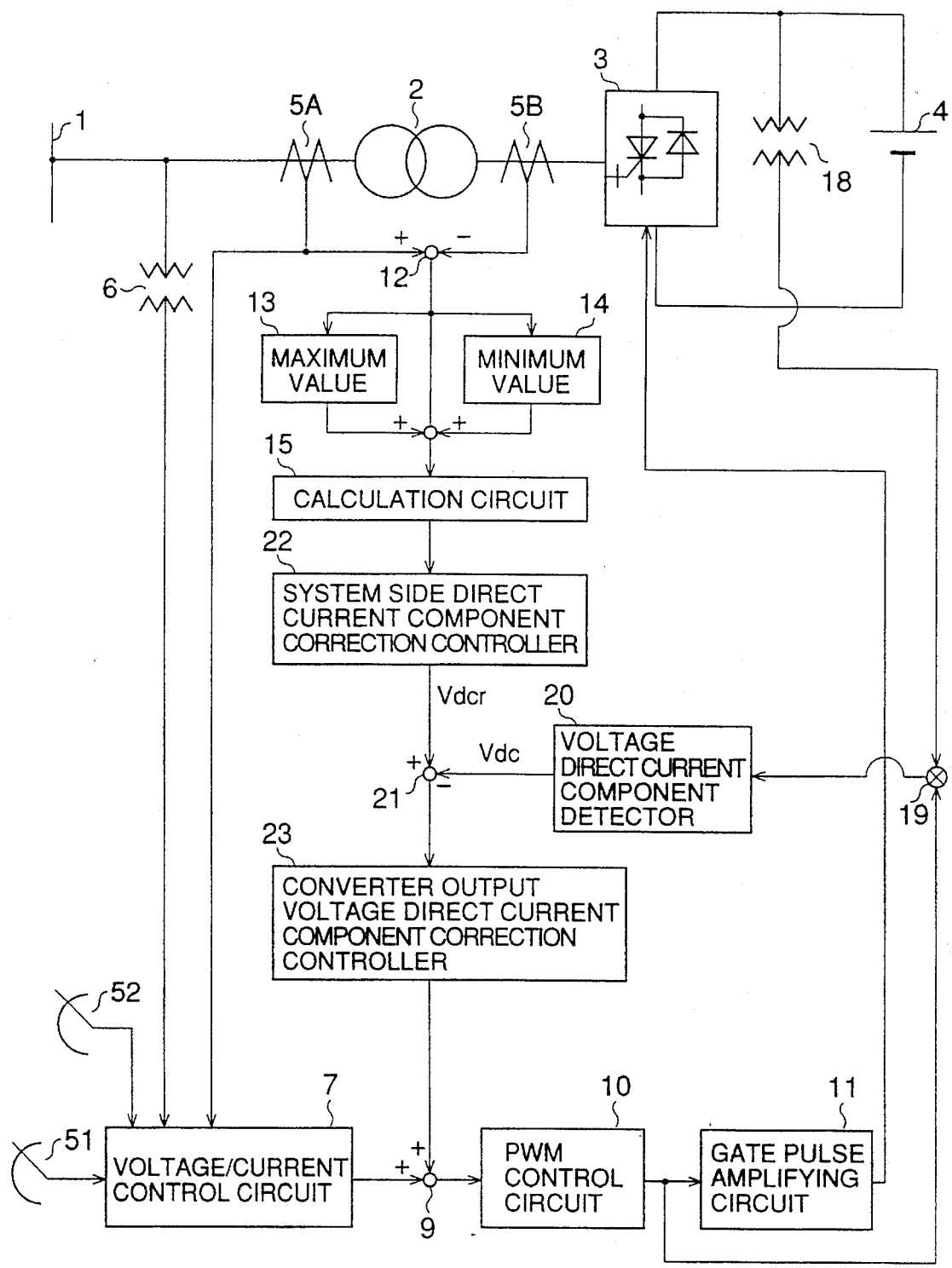
F I G. 6

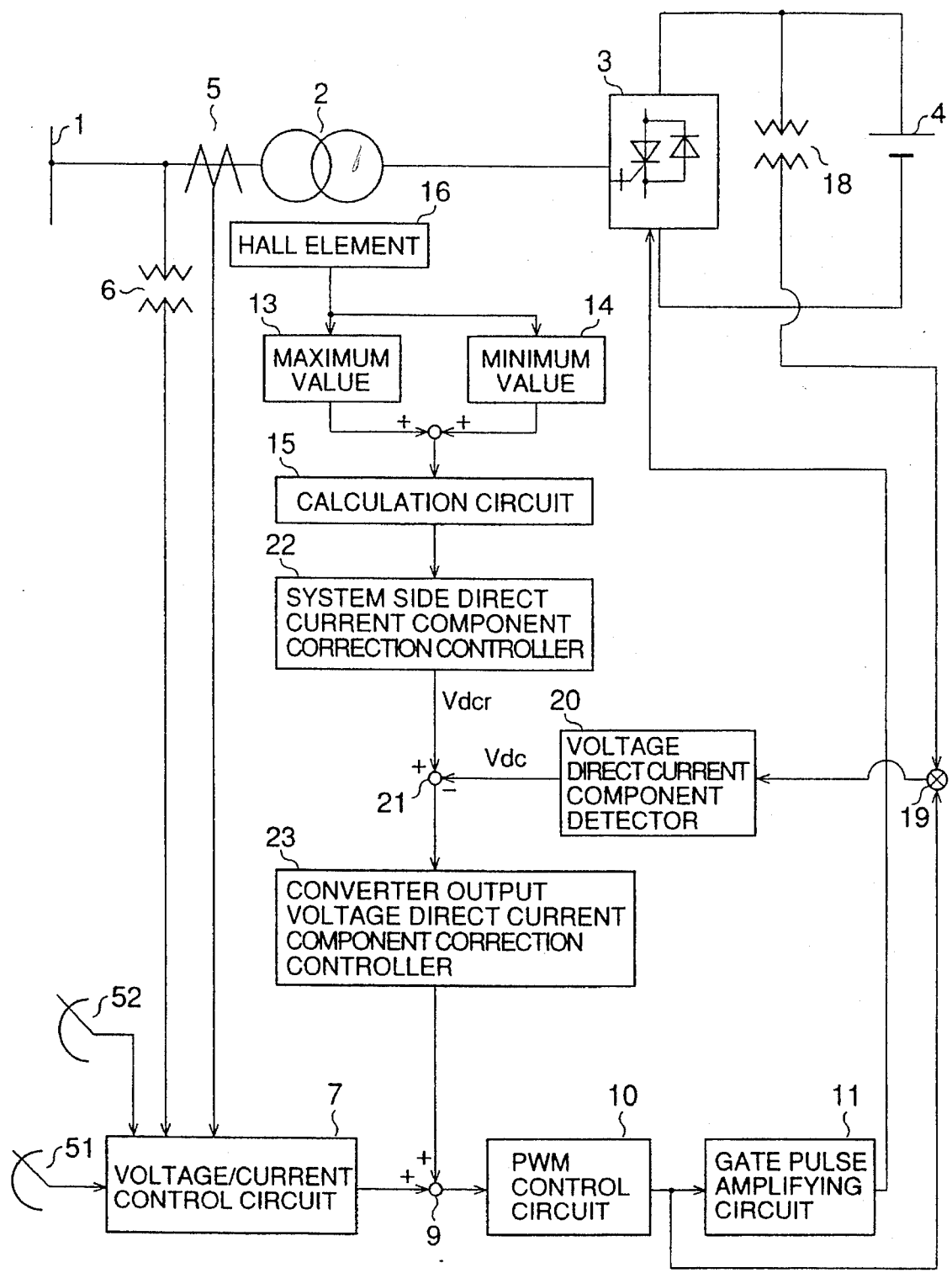
F I G. 8

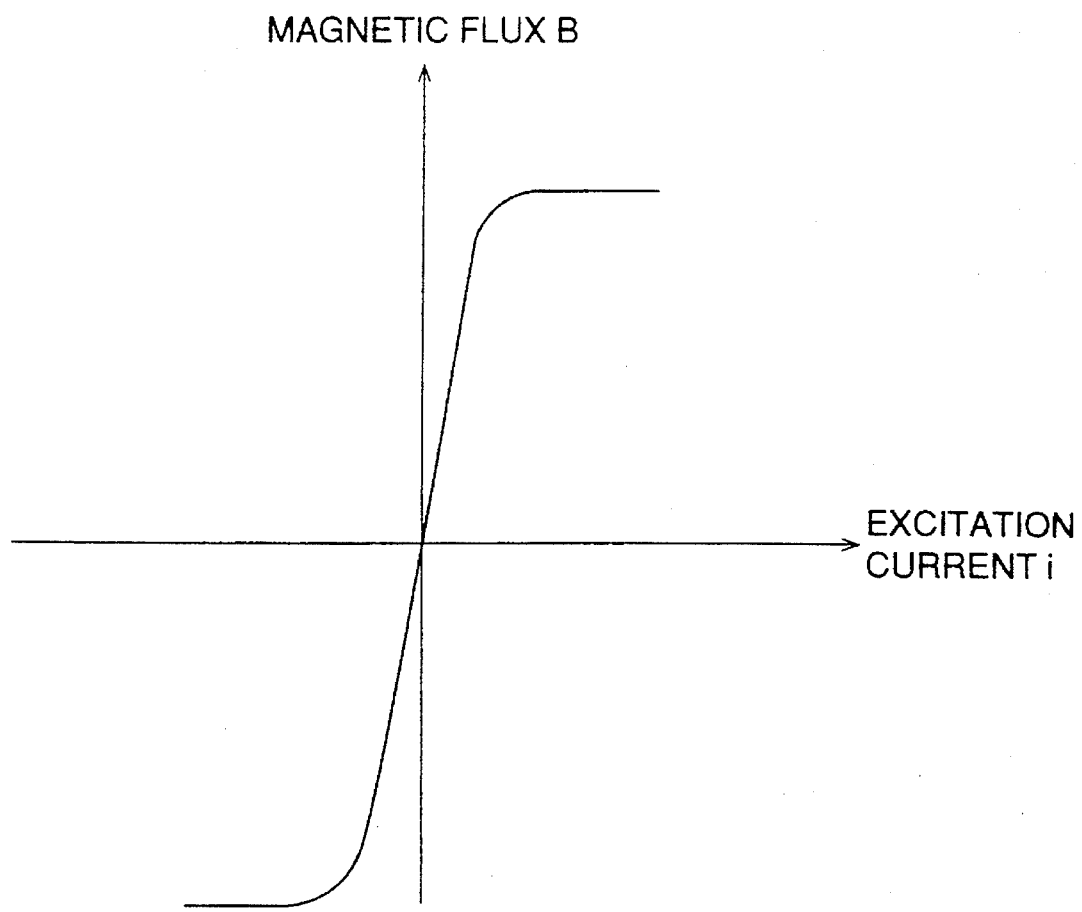
F I G.9

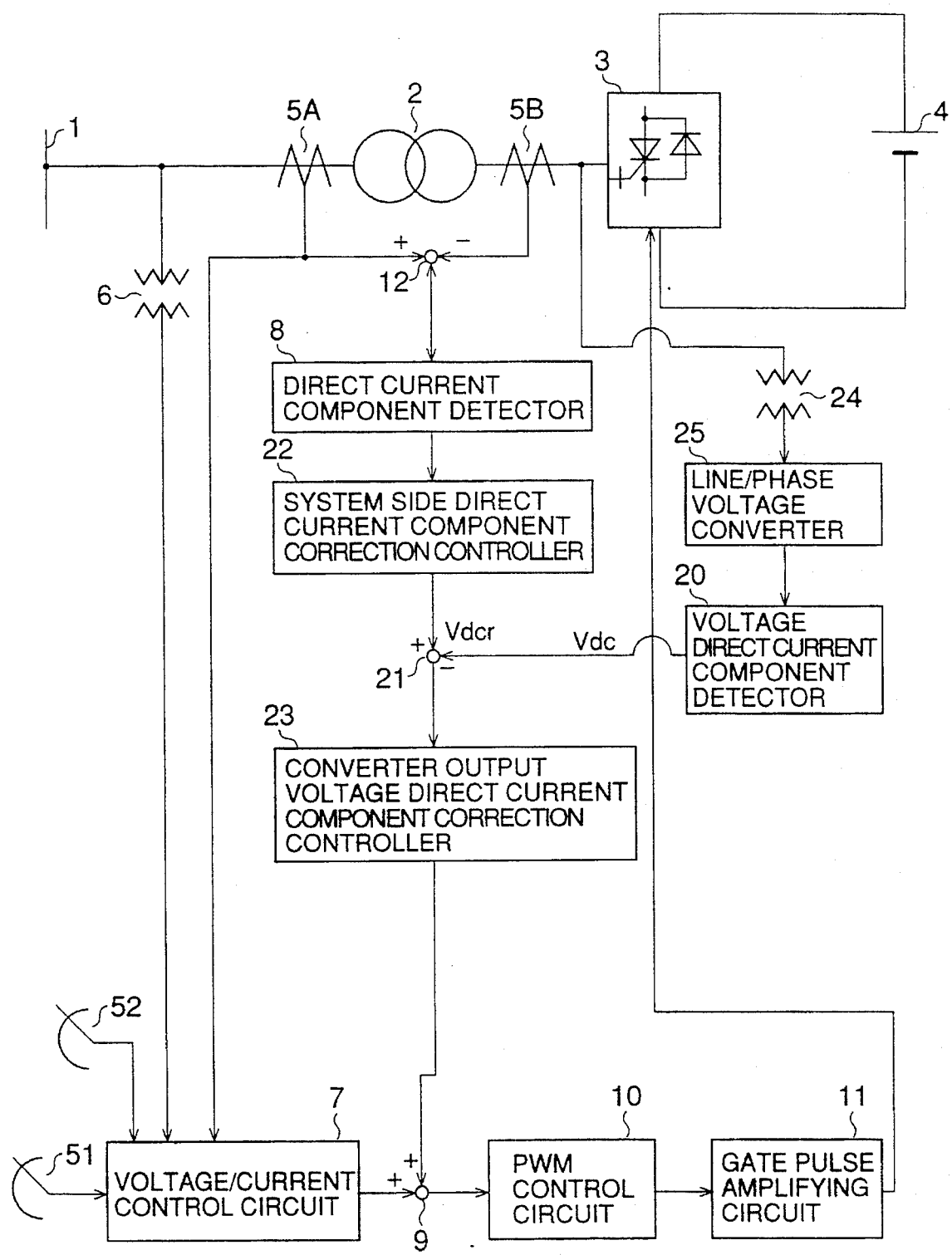
F I G. 10

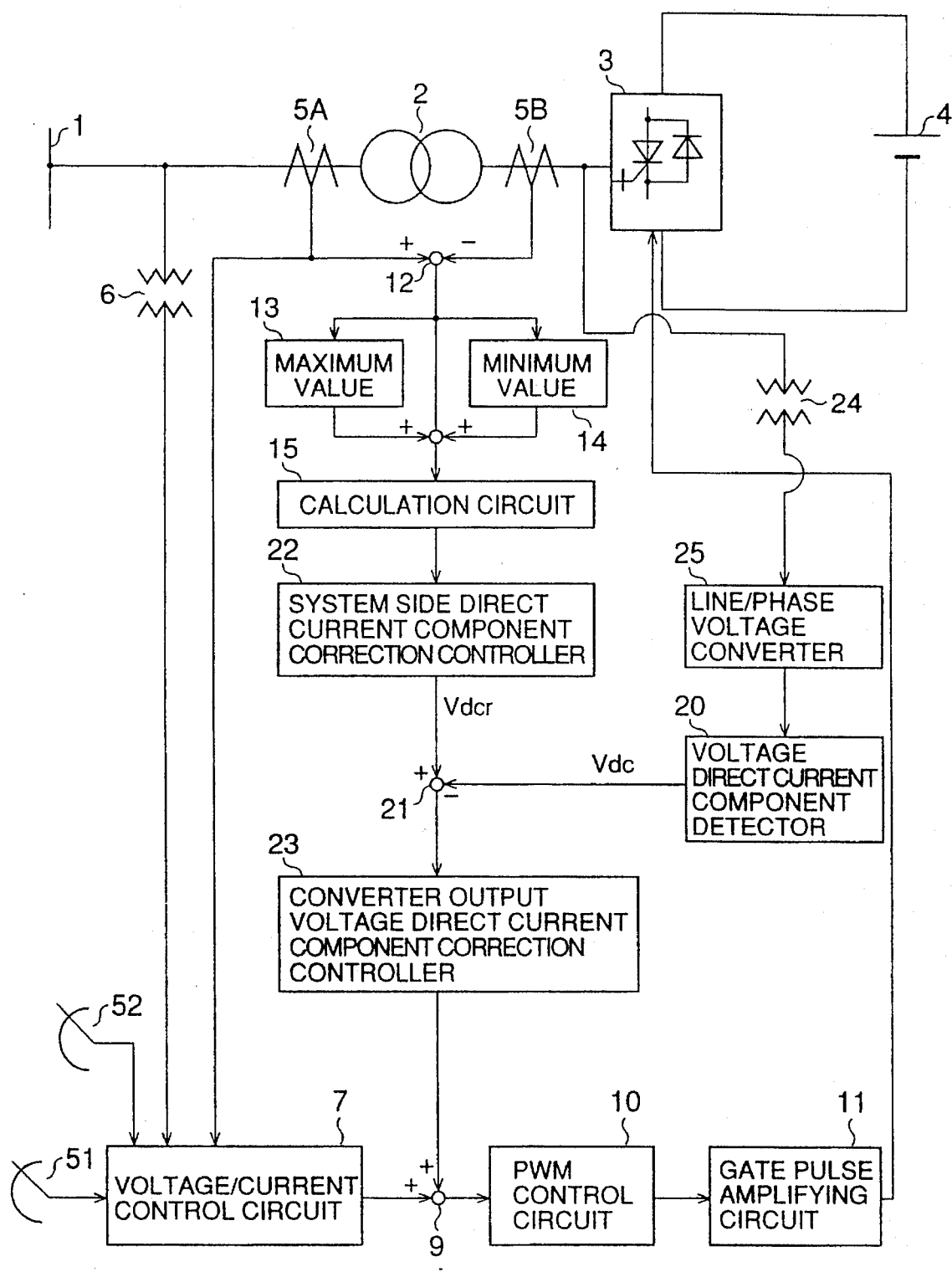
F I G. 11

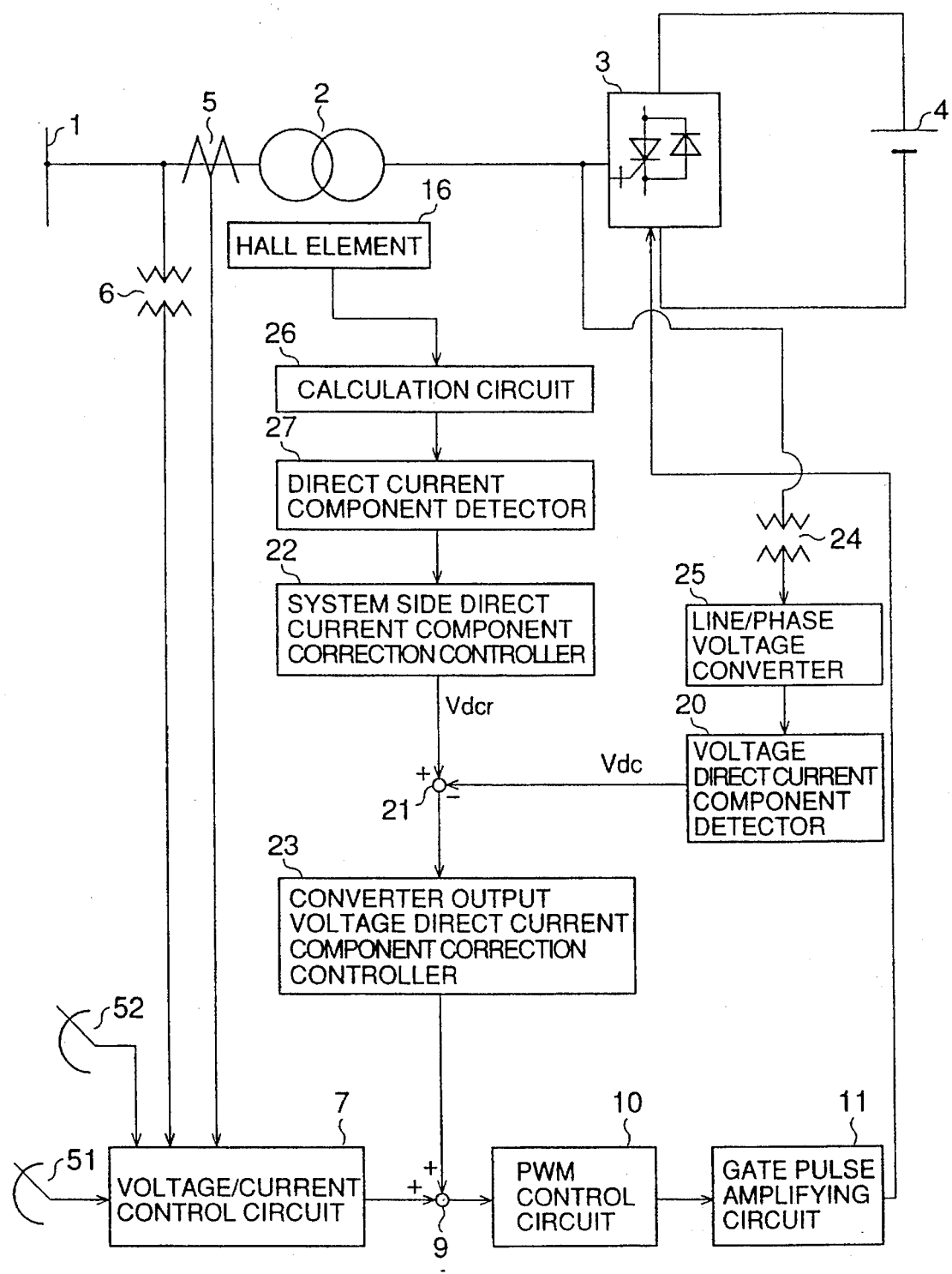
F I G. 14

10

APPARATUS FOR CONTROLLING CONVERTER HAVING SELF-ARC-EXTINCTION ELEMENTS

BACKGROUND OF THE INVENTION

The present invention relates to an apparatus for controlling a converter which is constituted by self-arc-extinction elements (hereafter defined as GTO) such as a gate turn-off thyristor and connected between a load and a power system through a transformer, and more particularly to a converter controlling apparatus capable of preventing a direct current magnetic deflection in the transformer.

FIG. 1 is a block diagram showing an apparatus for controlling a conventional converter (hereafter called as a self-commutation converter) including the GTO. In the figure, numeral 1 denotes a power system, 2 is a transformer for connecting the power system with a self-commutation converter 3, 4 is a direct current source such as a capacitor, 5A is a current detector for measuring a current of a primary coil in the transformer, 5B is a current detector for measuring an output current of the self-commutation converter 3, 6 is a potential transformer (PT) for measuring a voltage of the power system 1, 7 is a voltage/current control circuit for controlling a voltage and current in the system according to a system voltage reference 51 and an output current reference 52, 8 is a direct current component detector for detecting a direct current component included in the output current of the self-commutation converter 3 and the current which is measured by the current detector 5B, 9 is an adder for adding an output of the voltage/current control circuit 7 with an output of the direct current component detector 8, 10 is a pulse width modulation (PWM) control circuit for determining an ignition timing of the GTO corresponding to an output of the adder 9 and for regulating an output voltage, and 11 is a gate pulse amplifying circuit.

In FIG. 1, the PWM control circuit 10 determines a ignition pattern of the GTO in the manner that the direct current component is not included in the output voltage of the self-commutation converter 3. However, the actual output voltage has a waveform including a direct current component because of a characteristic of the GTO and an unevenness of a transmission time of a gate signal. When the direct current component is included in the output voltage of the self-commutation converter 3, an iron core of the transformer 2 is magnetically deflected because a product of time by voltage supplied to the transformer 2 per one cycle does not become to zero to increase an excitation current to be over, thereby stopping a protection of the self-commutation converter 3.

In the worst case, the situation results a destroy of the elements constituting the converter. For preventing a magnetic deflection in the conventional circuit shown in FIG. 1, the current detector 5B detects the output current of the self-commutation converter 3, the direct current component detector 8 detects the direct current component occurring in a step of reaching to the magnetic deflection, and the adder 9 adds the direct current component with an output voltage reference value from the voltage/current control circuit 7 to perform the PWM control, thereby regulating the output voltage of the self-commutation converter 3 in the manner of cancelling the magnetic deflection.

Even though the voltage of the power system 1 is an alternating current (AC) voltage, a direct current (DC) component is transitionally included in the voltage of the power system, for example, when a power capacitor or the transformer is switched on. However, even though the conventional control apparatus can correct the direct current component outputted from the self-commutation converter 3, the apparatus can not suppress the magnetic deflection by the direct current component generated by the power system 1 because the direct current component occurring in the power system is not corrected. Accordingly, when the direct current component is transitionally generated, the transformer 2 is magnetically deflected to reach to an overcurrent.

SUMMARY OF THE INVENTION

In view of the above-mentioned condition, an object of the present invention is to provide an apparatus for controlling a converter, which can suppress a magnetic deflection in a transformer even with respect to a direct current occurring from a power system side, and can continuously operate the converter without a protective stop for protecting the converter from the magnetic deflection of the transformer.

As a first aspect of the present invention, in an apparatus for controlling a converter constituted by self-arc-extinction elements and connected between a direct current load and a power system through a transformer by a pulse width modulation (PWM) corresponding to a first reference value of an output voltage of a voltage/current control circuit, the apparatus comprises first detection means for detecting a first electricity quantity necessary to obtain a deflection of a magnetic flux of an iron core of the transformer, magnetic deflection quantity calculation means for calculating a magnetic deflection quantity as the deflection of the magnetic flux of the iron core of the transformer on the basis of the first electricity quantity detected by the first detection means, system side direct current component calculation means for calculating a second reference value of a direct current component of an output voltage of the converter on the basis of the magnetic deflection quantity calculated by the magnetic deflection quantity calculation means, second detection means for detecting a second electricity quantity necessary to obtain a direct current component in the output voltage of the converter, converter side direct current component calculation means for calculating an actual value of the direct current component in the output voltage of the converter on the basis of the second electricity quantity detected by the second detection means, difference calculation means for obtaining a difference between the second reference value of the direct current component in the output voltage of the converter calculated by the system side direct current component calculation means and the actual value of the direct current in the output voltage of the converter calculated by the converter side direct current component calculation means, and converter output direct current component correction control means for introducing a third electricity quantity for correcting the output voltage of the converter on the basis of the difference between the second reference value and the actual value with respect to the direct current component in the output voltage of the converter obtained by the difference calculation means.

As a second aspect of the present invention, a converter control apparatus comprises a direct current component detector for detecting a direct current component included in a difference between current of a primary coil and a secondary coil of a transformer, a system side direct current component correction controller for calculating a reference value of the direct current component in an output voltage of the converter on the basis of the detected direct current component, a multiplier for calculating an output voltage of the converter on the basis of a DC voltage of the converter and a gate pulse pattern for controlling the converter, a voltage direct current component detector for detecting a voltage direct current component included in the output voltage of a multiplied result, and a converter output direct current component correction controller for correcting the output voltage of the converter on the basis of a difference between the detected voltage direct current component and the reference value of the output voltage direct current component.

As a third aspect of the present invention, a converter control apparatus comprises a maximum value detection circuit and a minimum value detection circuit for respectively detecting a maximum value and a minimum value of a difference between current of a primary coil and a secondary coil in a transformer, a calculation circuit for calculating a center value of a magnetic flux on the basis of the maximum value and the minimum value and a magnetic saturation characteristic of an iron core in the transformer, a system side direct current component correction controller for calculating a reference value of the direct current component in the output voltage of the converter on the basis of the detected center value of the magnetic flux, a multiplier for calculating the output value of the converter on the basis of the DC current of the converter and a gate pulse pattern for controlling the converter, a voltage direct current component detector for detecting a voltage direct current component included in the output voltage of a multiplied result, and a converter output direct current component correction controller for correcting the output voltage of the converter on the basis of a difference between the detected voltage direct current component and the reference value of the output voltage direct current component.

As a fourth aspect of the present invention, a converter control apparatus comprises means for detecting a magnetic flux of an iron core in a transformer, a maximum value detection circuit and a minimum value detection circuit for respectively detecting a maximum value and a minimum value of the magnetic flux, a calculation circuit for calculating a center value of the magnetic flux on the basis of the maximum value and the minimum value, a system side direct current component correction controller for calculating a reference value of the direct current component in the output voltage of the converter on the basis of the detected center value of the magnetic flux, a multiplier for calculating the output value of the converter on the basis of the DC current of the converter and a gate pulse pattern for controlling the converter, a voltage direct current component detector for detecting a voltage direct current component included in the output voltage of a multiplied result, and a converter output direct current component correction controller for correcting the output voltage of the converter on the basis of a difference between the detected voltage direct current component and the reference value of the output voltage direct current component.

As a fifth aspect of the present invention, a converter control apparatus comprises a direct current component detector for detecting a direct current component included in a difference between current of primary and secondary coils of a transformer, a system side direct current component correction controller for calculating a reference value of a direct current component of an output voltage of the converter on the basis of a detected direct current component, a line/phase voltage converter for calculating an output phase voltage from an output line voltage detected from the converter, a voltage direct current component detector for detecting a voltage direct current component included in the output phase voltage, and a converter output direct current component correction controller for correcting the output voltage of the converter on the basis of a difference between a reference value of the output voltage direct current component and the detected voltage direct current component.

As a sixth aspect of the present invention, a converter comprises a maximum value detection circuit and a minimum value detection circuit for respectively detecting a maximum value and a minimum value of a difference between current of a primary coil and a secondary coil in a transformer, a calculation circuit for calculating a center value of a magnetic flux on the basis of the maximum value and the minimum value and a magnetic saturation characteristic of an iron core in the transformer, a system side direct current component correction controller for calculating a reference value of the direct current component in the output voltage of the converter on the basis of the detected center value of the magnetic flux, a multiplier for calculating the output value of the converter on the basis of the DC current of the converter and a gate pulse pattern for controlling the converter, a line/phase voltage converter for calculating an output phase voltage from an output line voltage detected from the converter, a voltage direct current component detector for detecting a voltage direct current component included in the output phase voltage, and a converter output direct current component correction controller for correcting the output voltage of the converter on the basis of a difference between a reference value of the output voltage direct current component and the detected voltage direct current component.

As a seventh aspect of the present invention, a converter control apparatus comprises means for detecting a magnetic flux of an iron core in a transformer, a maximum value detection circuit and a minimum value detection circuit for respectively detecting a maximum value and a minimum value of the magnetic flux, a calculation circuit for calculating a center value of the magnetic flux on the basis of the maximum value and the minimum value, a system side direct current component correction controller for calculating a reference value of the direct current component in the output voltage of the converter on the basis of the detected center value, a line/phase voltage converter for calculating an output phase voltage from an output line voltage detected from the converter, a voltage direct current component detector for detecting a voltage direct current component included in the output phase voltage, and a converter output direct current component correction controller for correcting the output voltage of the converter on the basis of a difference between a reference value of the output voltage direct current component and the detected voltage direct current component.

As an eighth aspect of the present invention, a converter control apparatus comprises means for detecting a magnetic flux, a direct current component detector for detecting a direct current component on the basis of the magnetic flux, a system side direct current component correction controller for calculating a reference value of the direct current component in the output voltage of the converter on the basis of the detected direct current, a multiplier for calculating the output voltage of the converter on the basis of a DC voltage of the converter and a gate pulse for controlling the converter, a voltage direct current component detector for detecting a voltage direct current component included in a multiplied result, and a converter output direct current component correction controller for correcting the output voltage of the converter on the basis of a difference between a reference value of the output voltage direct current component and the detected voltage direct current component.

As a ninth aspect of the present invention, a converter control apparatus comprises means for detecting a magnetic flux of a core of a transformer, a direct current component detector for detecting a direct current component in the magnetic flux, a system side direct current component correction controller for calculating a reference value of the direct current component in the output voltage of the converter on the basis of the detected direct current, a line/phase voltage converter for calculating an output phase voltage on the basis of a output line voltage detected from the converter, a voltage direct current component detector for detecting a voltage direct current component included in the output phase voltage, and a converter output voltage direct current component correction controller for correcting the output voltage of the converter on the basis of a difference between the detected voltage direct current component and the reference value of the output voltage direct current component.

The converter control apparatus according to the first aspect of the present invention detects the first electricity quantity necessary to obtain a deflection of the magnetic flux of the iron core in the transformer which is connected to the converter, calculates a magnetic deflection quantity on the basis of the first electricity quantity, and calculates the reference value of the direct current component in the output voltage of the converter for cancelling the magnetic deflection. On the other hand, the control apparatus detects the second electricity quantity necessary to obtain the direct current component in the output voltage of the converter, calculates the output voltage direct current component on the basis of the detected second electricity quantity, and corrects the output voltage of the converter on the basis of the difference between the reference value of the output voltage direct current component and the calculated output voltage direct current component. If the above control is performed, since the apparatus can correct not only the direct current component included in the output of the converter but also the transitional direct current component caused by the power system, it is possible to suppress the magnetic deflection in the transformer and to continuously operate the converter without the protective stop for preventing the converter from the over-current caused by the magnetic deflection of the transformer.

The converter control apparatus according to the second aspect of the present invention uses the difference between current of the primary and secondary coils in the transformer, in which the difference current corresponds to the excitation current of the transformer. The control apparatus detects the direct current component included in the excitation current, and calculates the reference value of the output voltage direct current component of the converter necessary to eliminate the deflection of the magnetic flux of the iron core in the transformer on the basis of the direct current component. On the other hand, the apparatus calculates the output voltage of the converter on the basis of the DC voltage of the converter and the gate pulse pattern for controlling the converter, detects the voltage direct current component included in the output voltage, and corrects the output voltage of the converter on the basis of the difference between the voltage direct current component and the reference value of the direct current component. According to the above control, since the apparatus can correct not only the direct current component included in the output of the converter but also the transitional direct current component occurring in the power system, it is possible to suppress the magnetic flux of the transformer, and to continuously operate the converter without the protective stop caused by the over-current by the magnetic flux of the transformer.

The control apparatus according to the third aspect of the present invention detects the maximum and minimum values during one cycle of the differential current of the primary and secondary coils in the transformer, and obtains the center value of the magnetic flux on the basis of the detected maximum and minimum values and magnetic saturation of the core in the transformer. Accordingly, the direct current shifted component in the magnetic flux can be detected, and the reference value is calculated with respect to the output voltage direct current component of the converter necessary to cause the direct current shifted component of the magnetic flux of the transformer to be zero on the basis of the center value. On the other hand, the apparatus calculates the output voltage of the converter on the basis of the DC voltage of the converter and the gate pulse pattern for controlling the converter, detects the voltage direct current component included in the calculated output voltage, and corrects the output voltage of the converter on the basis of the difference between the direct current component and the reference value of the output voltage direct current component. Therefore, since the control apparatus can correct not only the direct current component included in the output of the converter but also the transitional direct current component occurring in the power system, it is possible to suppress the magnetic flux of the transformer and to continuously operate the converter without the protective stop caused by the over-current by the magnetic deflection in the transformer.

The control apparatus according to the fourth aspect of the present invention provides the means for detecting the magnetic flux of the core in the transformer to detect the center value of the minimum and maximum values of the flux so as to detect the direct current shifted component in the magnetic flux, and calculates the reference value of the direct current component in the output voltage on the basis of the center value in order to cause the direct current shifted component of the flux to be zero. On the other hand, the apparatus calculates the output voltage of the converter on the basis of the direct current of the converter and the gate pulse pattern for controlling the converter, detects the voltage direct current component included in the output voltage, and corrects the output voltage of the converter on the basis of the difference between the voltage direct current and the reference value of the output voltage direct current component. Accordingly, since the apparatus can correct not only the direct current component included in the output of the converter but also the transitional direct current component occurring in the power system, it is possible to suppress the magnetic deflection of the transformer, thereby continuously operating the converter without the protective stop from the over-current of the transformer.

The control apparatus according to the fifth aspect of the present invention uses the difference current between the current of the primary and secondary coils of the transformer, which corresponds to the excitation current of the transformer. The apparatus detects the direct current component included in the excitation current, and calculates the reference value of the output voltage direct current component of the converter necessary to eliminate the deflection of the magnetic flux of the iron core in the transformer on the basis of the direct current component. On the other hand, the apparatus detects the output line voltage of the transformer, calculates the output phase voltage on the basis of the output line voltage, detects the voltage direct current component included in the output phase voltage, and corrects the output voltage of the converter on the basis of the difference between the voltage direct current component and the reference value of the output voltage direct current component. According to the control, since the apparatus can correct not only the direct current component included in the output of the converter but also the transitional direct current component occurring in the power system, it is possible to suppress the magnetic deflection of the transformer, thereby continuously operating without the protective stop for the over-current caused by the magnetic deflection of the transformer.

The converter control apparatus according to the sixth aspect detects the maximum and minimum values in one cycle of the differential current between the current of the primary and secondary coils in the transformer, obtains the center value of the magnetic flux on the basis of the detected maximum and minimum values and magnetic saturation characteristics of the core in the transformer to detect the direct current shifted component of the magnetic flux, and calculates the reference value of the direct current component of the output voltage of the converter necessary to cause the direct current shifted component of the magnetic flux of the transformer to be zero on the basis of the center value. On the other hand, the apparatus detects the output line voltage of the transformer, calculates the output phase voltage from the output line voltage, detects the voltage direct current component included in the output phase voltage, and corrects the output voltage of the converter on the basis of the difference between the voltage direct current component and the reference value of the output voltage direct current component. By this, since the apparatus corrects not only the direct current component included in the output of the converter but also the transitional direct current component occurring in the power system, it is possible to suppress the magnetic deflection of the transformer, thereby continuously operating without the protective stop for the over-current caused by the magnetic deflection of the transformer.

The converter control apparatus according to the seventh aspect of the present invention has the means for detecting the magnetic flux of the iron core in the converter, detects the direct current shifted component of the magnetic flux by the detection of the center value of the maximum and minimum values of the magnetic flux, and calculates the reference value of the output voltage direct current component of the converter necessary to cause the direct current shifted component of the magnetic flux of the converter to be zero on the basis of the center value. On the other hand, the apparatus detects the output line voltage of the converter, calculates the output phase voltage from the output line voltage, detects the voltage direct current component included in the output phase voltage, and corrects the output voltage of the converter on the basis of the difference between the voltage direct current component and the reference value of the output voltage direct current component. According to the control, since the apparatus can correct not only the direct current component included in the output of the converter but also the transitional direct current component occurring in the power system side, it is possible to suppress the magnetic deflection of the transformer, thereby continuously operating the converter without the protective stop for the over-current caused by the magnetic deflection of the transformer.

The converter control apparatus according to the eighth aspect has the means for detecting the magnetic flux of the core in the transformer to detect the direct current component of the magnetic flux, calculates the direct current component corresponding to the excitation current, and calculates the reference value of the output voltage direct current component of the converter necessary to cause the direct current shifted component of the transformer to be zero on the basis of the direct current component. On the other hand, the apparatus calculates the output voltage of the converter on the basis of the DC voltage of the converter and the gate pulse pattern for controlling the converter, detects the voltage direct current component included in the output voltage, and corrects the output voltage of the converter on the basis of the difference between the voltage direct current component and the reference value of the output voltage direct current component. According to the control, since the apparatus can correct not only the direct current component included in the output voltage of the converter but also the transitional direct current occurring in the power system, it is possible to suppress the magnetic deflection of the converter, thereby continuously operating the converter without the protective stop for the over-current caused by the magnetic deflection of the converter.

The converter control apparatus according to the ninth aspect has the means for detecting the magnetic deflection of the iron core in the transformer to detect the direct current component of the magnetic flux, calculates the direct current component corresponding to the excitation current, and calculates the reference value of the output voltage direct current component of the converter necessary to cause the direct current shifted component of the magnetic flux of the converter to be zero on the basis of the direct current component. On the other hand, the apparatus detects the output line voltage of the converter, calculates the output phase voltage from the output line voltage, detects the voltage direct current component included in the output phase voltage, and corrects the output voltage of the converter on the basis of the difference between the voltage direct current component and the reference value of the output voltage direct current component. According to the control, since the apparatus can correct not only the direct current component included in the output of the converter but also the transitional direct current component occurring in the power system, it is possible to suppress the magnetic deflection of the transformer, thereby continuously operating the converter without the protective stop for the over-current caused by the magnetic deflection of the transformer.

As described above, since the present invention has the constitution in the manner of not only correcting the direct current component outputted from the converter but also suppressing the magnetic deflection of the transformer caused by the direct current component occurring in the power system, the protective stop caused by the magnetic deflection can be eliminated, thereby continuously operating the converter.

BRIEF DESCRIPTION OF THE DRAWINGS

In the accompanying drawings:

FIG. 2 is a block diagram showing a constitution of a converter control apparatus according to a first embodiment of the present invention;

FIG. 3 is a block diagram showing a constitution of a converter control apparatus according to a second embodiment of the present invention;

FIG. 4 is a circuit diagram showing a simple equivalent circuit of a transformer;

FIG. 6 is a block diagram showing a constitution of a converter control apparatus according to a third embodiment of the present invention;

FIG. 8 is a block diagram showing a constitution of a converter control apparatus according to a fourth embodiment of the present invention;

FIG. 9 is a diagram showing a relationship of an excitation current and a magnetic flux of an iron core in a transformer;

FIG. 10 is a block diagram showing a constitution of a converter control apparatus according to a fifth embodiment of the present invention;

FIG. 11 is a block diagram showing a constitution of a converter control apparatus according to a sixth embodiment of the present invention;

FIG. 14 is a block diagram showing a constitution of a converter control apparatus according to a ninth embodiment of the present invention.

DETAILED DESCRIPTION OF THE PREFERRED EMBODIMENTS

Figure 1:
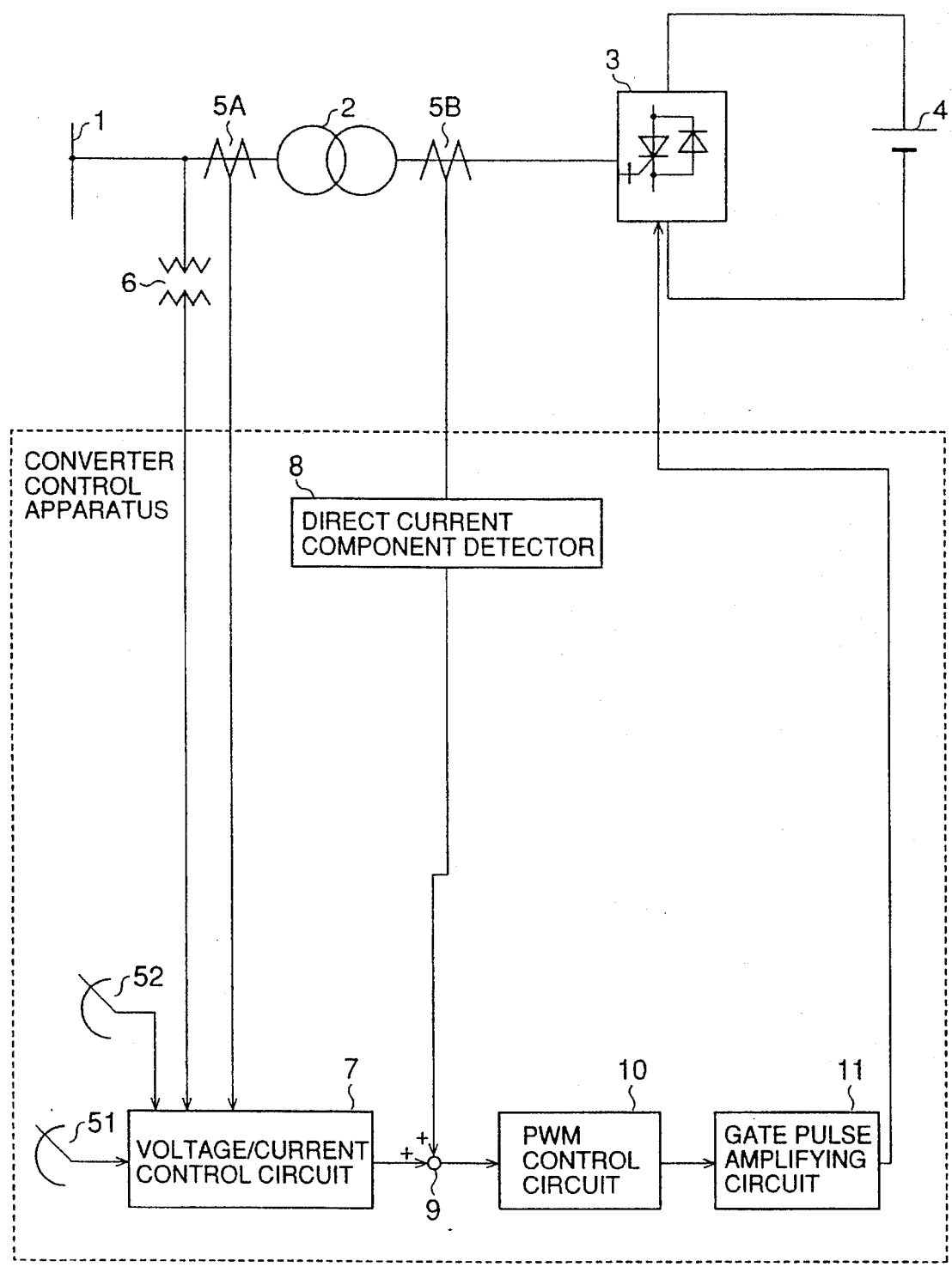
FIG. 1 is a block diagram showing the conventional converter control apparatus.
Figure 5A:
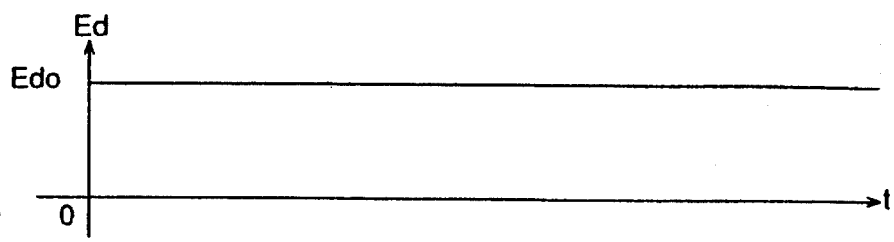
FIGS. 5(a)–(e) are diagrams for explaining an output voltage of the converter.
Figure 5B:
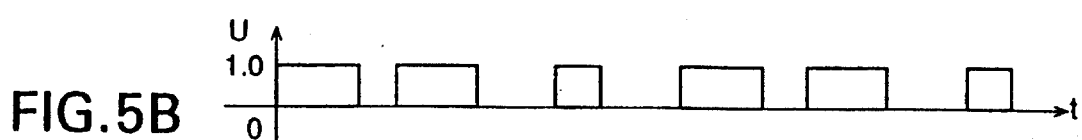
Figure 5C:
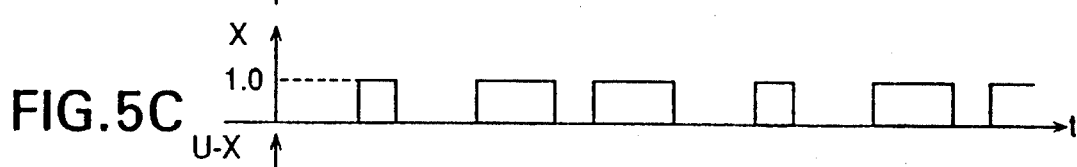
Figure 5D:
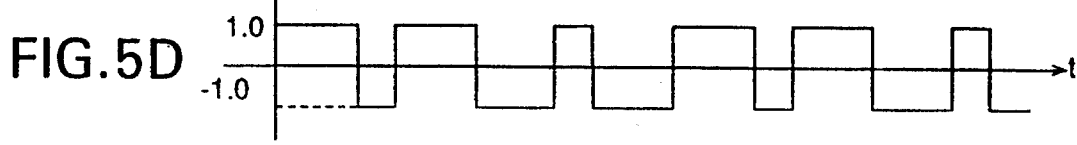
Figure 5E:
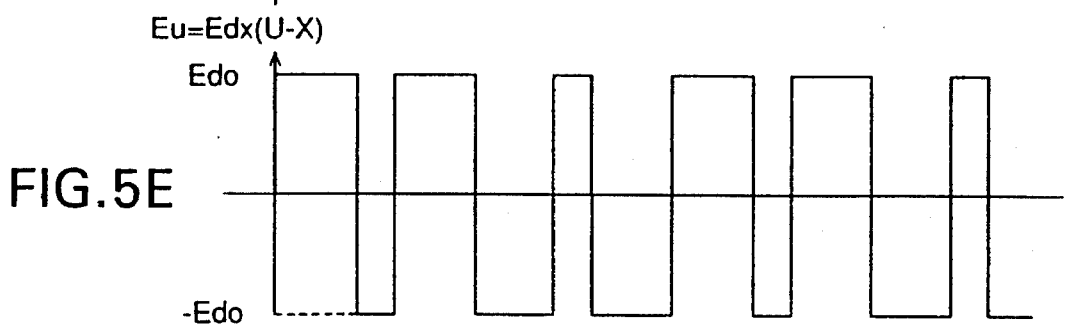

There will be described in detail a converter control apparatus according to preferred embodiments of the present invention in reference with the attached drawings.

First, there is described a converter control apparatus according to a first embodiment of the present invention. FIG. 2 is a block diagram showing a schematic constitution of the converter control apparatus according to the first embodiment of the present invention. In FIG. 2, a description about elements as the same in FIG. 1 already described is omitted by attaching the same numerals. In the figure, numeral 30 denotes a first detection means for detecting a first electricity quantity $P_1-P_n$ necessary to obtain a deflection of a magnetic flux in an iron core of a transformer 2, 31 is magnetic deflection quantity calculation means for calculating a magnetic deflection of the transformer 2 on the basis of the first electricity quantity $P_1-P_n$ detected by the first detection means 30, and 22 is system side direct current component calculation means for calculating a reference value $V_{dcr}$ of a direct current component of an output voltage of the converter 3.

Furthermore, the apparatus comprises second detection means 40 for detecting a second electricity quantity $Q_1-Q_n$ necessary to obtain a direct current component in the output voltage of the converter 3, converter output direct current component calculation means 32 for calculating an actual direct current component value $V_{dc}$ included in the output voltage of the converter 3, difference calculation means 21 for calculating a difference between the reference value $V_{dcr}$ supplied from the calculation means 22 and the actual value $V_{dc}$ supplied from the calculation means 32, and converter output direct current component correction control means 23 for calculation a correction quantity of the output voltage of the converter on the basis of the difference between the reference vale $V_{dcr}$ and the actual value $V_{dc}$.

The magnetic deflection quantity calculation means 31 calculates the magnetic deflection quantity on the basis of the first electricity quantity $P_1-P_n$ which is detected by the first detection means 30 and necessary to obtain the deflection of the magnetic flux of the iron core of the transformer 2 connected with the converter 3. On the basis of the calculation result, the system side direct current component calculation means 22 calculates the reference value $V_{dcr}$ of the direct current component in the output voltage of the converter 3 necessary to eliminate the deflection of the magnetic deflection.

On the other hand, the converter output direct current component calculation means 32 calculates the actual value of the direct current component in the output voltage of the converter 3 on the basis of the second electricity quantity $Q_1-Q_n$ necessary to obtain the direct current component and detected by the second detection means 40. The difference calculation means 21 obtains the difference between the reference value $V_{dcr}$ and the actual value $V_{dc}$ of the direct current component in the output voltage of the converter 3, and the correction control means 23 calculates the correction quantity of the output voltage to correct the output voltage reference value outputted from the voltage/current control circuit 7 in the manner of cancelling the magnetic deflection. Accordingly, since it is possible to correct not only the direct current included in the output of the converter 3 but also the transitional direct current component occurring in the power system 1, the magnetic deflection of the transformer 2 can be suppressed, thereby providing the converter 3 which can be continuously operated without the protective stop for the over-current caused by the magnetic flux of the transformer 2.

Next, there is described a converter control apparatus according to a second embodiment of the present invention. FIG. 3 shows an entire constitution of the converter control apparatus according to the second embodiment of the present invention. In FIG. 3, numeral 5A denotes a current detector for detecting a current of a primary coil in the transformer 2. Numeral 12 denotes a subtracter for taking into a difference between the current of the primary and secondary coils, in which the current of the primary coil us detected by the current detector 5A and the current of the secondary coil is detected by the current detector 5B. Numeral 18 denotes a potential device for measuring a voltage in the direct current side of the converter 3, 19 denotes a multiplier for calculating an output voltage of the converter 3 by multiplying the direct current of the converter 3 after a detection by a gate pulse pattern outputted from a PWM control circuit 10, and 20 denotes a voltage direct current component detector for detecting a direct current component in the output voltage of the converter 3 which is calculated in the multiplier 19.

Here, there are two systems with respect to a constitution of the direct current detector. One of systems obtains a mean value in which an input signal (in this portion, a detected value of the voltage or current) is integrated by a cycle of a fundamental power source frequency and the integrated value of the input signal is averaged by a time. The other system extracts only a direct current component after the input signal is passed through a low-pass filter. It is possible to provide the system of the direct current component detector having the same configuration in the entire embodiments.

FIG. 4 shows an equivalent circuit of the general transformer. In FIG. 4, symbols $X_1$ and $X_2$ respectively denote leakage inductance of the transformer, $R_1$ and $R_2$ are copper loss, $X_0$ is excitation inductance, and $i_1$, $i_2$ and $i_3$ are primary current, secondary current and excitation current, respectively. As can be understood from the equivalent circuit in FIG. 4, when a winding ratio of the transformer is simplified to be one, the excitation current of the transformer is equal to a difference between the primary and secondary current. Since the excitation current substantially corresponds to a magnetic flux of the iron core in the transformer, it is possible to estimate the direct current magnetic deflection quantity if the direct current component is only detected from the excitation current.

The subtracter 12 shown in FIG. 3 calculates the difference between current of the primary and secondary coils, the direct current component detector 8 detects a direct current component, and the system side direct current component correction controller 22 calculates a reference value of the direct current component in the output voltage of the converter 3, which is necessary to cause the direct current component in the excitation current to be zero.

On the other hand, when the gate pulse pattern obtained by the PWM control circuit 10 is changed into a certain numeral within the range of −1 to 1 is multiplied by the direct current (DC) voltage, it is possible to obtain the output voltage of the converter 3 as shown in FIGS. 5(a)–(e). In FIGS. 5(a)–(e), $E_d$ is a direct current voltage, U is a gate pulse pattern in a U-phase, X is a gate pulse pattern in an X-phase, $E_u$ is an output voltage of the transformer (in the U-phase), and t is a time. The voltage direct current component detector 20 detects the direct current component in the output voltage of the transformer 3, the subtracter 21 calculates the difference between the actual value of the detected direct current component and the reference value of the direct current component in the output voltage of the converter 3, and the converter output direct current component correction controller 23 calculates the correction quantity of the output voltage of the converter 3 in the manner that the direct current component in the output voltage of the converter 3 becomes to be equal to the reference value.

If the output voltage reference value of the voltage/current control circuit 7 is corrected by using the correction quantity in the manner of cancelling the magnetic deflection, since it is possible to correct not only the direct current component included in the output of the converter 3 but also the transitional direct current occurring in the power system 1 so as to suppress the magnetic deflection, thereby providing the converter 3 capable of continuously operating without the protective stop for the over-current caused by the magnetic deflection of the transformer 2.

There is described a converter control apparatus according to a third embodiment of the present invention. FIG. 6 is a block diagram showing a constitution of the converter control apparatus according to the third embodiment of the present invention. In FIG. 6, components the same as those in FIGS. 1–3 are attached as the same numerals to eliminate the duplicate description. In the figure, numeral 13 denote a maximum value detection circuit for detecting at every fundamental frequency of the power source a maximum value of the difference current between the current of the primary and secondary coils calculated by the subtracter 12, 14 denotes a minimum value detection circuit for detecting a minimum value of the difference current at every fundamental frequency, and 15 denotes a calculation circuit for calculating a center value of the magnetic flux on the basis of the maximum value, minimum value and the magnetic saturation characteristics of the iron core. The magnetic saturation characteristics curve is formed on the basis of data obtained by a simplex test, and stored in the calculation circuit as the data.

Figure 7:
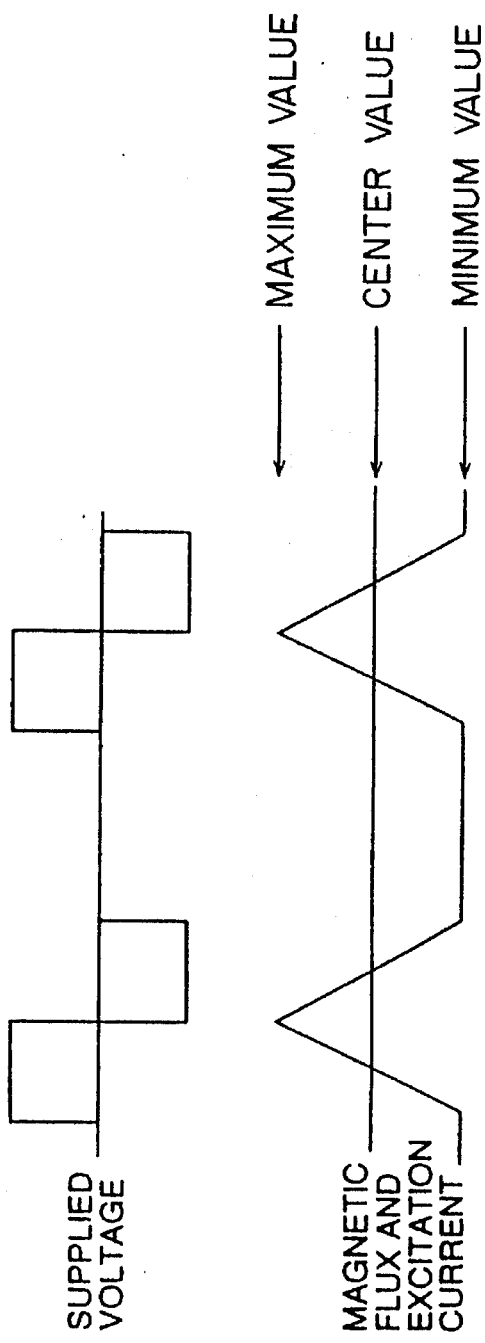
FIGS. 7(a)–(b) are diagrams showing a result of a magnetic flux and an excitation current when an irregular AC voltage is impressed.

According to the above constitution, when an irregular alternating current (AC) voltage as shown in FIGS. 7(a)–(b) has a period while a constant value of the magnetic flux and excitation current continues, it is possible to obtain the proper magnetic deflection quantity by detecting the center value of the magnetic flux. On the basis of the proper magnetic deflection, the system side direct current component correction controller 22 calculates the reference value of the direct current component in the output voltage of the converter 3 necessary to cause the direct current shifted component of the magnetic flux to be zero. Since circuit operation after this are the same as that of the controller in the second embodiment, duplicate description will be omitted.

According to the third embodiment, even when the irregular AC voltage is supplied to the transformer 2 so as to generate the period while the constant value continues with respect to the magnetic flux and excitation current, since it is possible to correct not only the direct current component included in the output of the converter 3 but also the transitional direct current component occurring in the power system 1, the magnetic deflection in the transformer 2 can be suppressed to thereby provide a converter 3 capable of continuously operating without the protective stop for the over-current caused by the magnetic deflection of the transformer 2.

Next, there is described a converter control apparatus according to a fourth embodiment of the present invention. FIG. 8 is a block diagram showing a schematic configuration of the converter control apparatus according to the fourth embodiment of the present invention. In FIG. 8, since components as the same in FIGS. 1–3 and 6 are attached by the same numerals in those figures, the duplicate description is omitted. In FIG. 8, numeral 16 denotes a magnetic detector such as a Hall element for detecting a magnetic flux of the iron core in the transformer 2. In the fourth embodiment shown in FIG. 8, the apparatus uses the magnetic flux peak value of the transformer iron core in the place of the difference current of the primary and secondary current in the transformer so as to calculate the reference value of the direct current component in the output voltage of the converter 3.

As shown in FIG. 9, since the relationship of the excitation current i and the magnetic flux B is non-linear, the excitation current increases step by step until the iron core flux becomes to a saturation, and the current sharply increases when the core flux becomes to the saturation. Accordingly, it is necessary to detect the fine direct current component or the fine change in the excitation current in order to detect the suppress the magnetic deflection by the correction of the output voltage reference value before the magnetic flux in the iron core is saturated. Moreover, it is necessary to detect in a high-accuracy the excitation current in order to detect the fine change. However, since the excitation current is less than 10% of the rated current of the transformer, it is necessary to provide a current detector having an accuracy of 0.1% when the excitation current of 10% of the rated current, for example, is detected by an accuracy of 1% in the case where the excitation current is detected by the difference current of the primary and secondary coils in the transformer. Since circuit operation are the same as those of the second embodiment, duplicate description will be omitted.

According to the fourth embodiment, since the magnetic flux of the iron core in the transformer 2 is detected to calculate the reference value of the direct current component in the output voltage of the converter 3, it is possible to efficiently control the converter by the controlled quantity linearly corresponding to the detected quantity. Furthermore, since it is unnecessary to perform a control corresponding to the fine changes, it is unnecessary to provide the current detector and calculation circuit respectively having a specifically high-accuracy, thereby applying the normal detector or calculation circuit to the control apparatus. Still furthermore, since the control apparatus can correct not only the direct current component included in the output voltage of the converter 3 but also the transitional direct current component occurring in the power system 1, it is possible to suppress the magnetic deflection in the transformer 2, thereby providing the converter capable of continuously operating without the protective stop for the over-current caused by the magnetic deflection of the transformer 2.

There is described a converter control apparatus according to a fifth embodiment of the present invention. FIG. 10 is a block diagram showing the schematic configuration of the converter control apparatus according to the fifth embodiment of the present invention. Since components in FIG. 10 attached by numerals the same as the numerals in FIGS. 1–3, FIG. 6 and FIG. 8 are the same components of the above embodiments, duplicate description is omitted. In FIG. 10, numeral 24 denotes a potential device for measuring line voltage $V_{RS}$, $V_{ST}$ and $V_{TR}$ of the converter 3, and 25 denotes a line/phase voltage converter for calculating phase voltage $V_R$, $V_S$ and $V_T$ on the basis of the detected line voltage by using the following equation (1):

$$V_R = (V_{RS} - V_{TR})/3 \quad (1)$$
$$V_s = (V_{ST} - V_{RS})/3$$
$$V_T = (V_{TR} - V_{ST})/3.$$

In FIG. 10, there is the same as the second embodiment with respect to function and operation from an obtain of the difference between current of the primary and secondary coils in the transformer to a calculation of the reference value $V_{dcr}$ of the direct current component of the output voltage of the converter 3.

On the other hand, the line voltage of the converter 3 is detected, the output phase voltage is calculated by the equation (1), the voltage direct current detector 20 detects the direct current component thereof, and the converter output direct current component correction controller 23 calculates the correction quantity of the output voltage of the converter 3 in the manner that the direct current component of the output voltage of the converter 3 becomes to be equal to the reference value.

When the output voltage reference value from the voltage/current control circuit 7 is corrected by the correction quantity to cancel the magnetic deflection, since it is possible to correct not only the direct current component included in the output of the converter 3 but also the transitional direct component occurring in the power system 1, it is possible to suppress the magnetic deflection so as to provide the converter 3 capable of continuously operating without the protective stop caused by the magnetic deflection of the transformer 2.

There is described a converter control apparatus according to a sixth embodiment of the present invention. FIG. 11 is a block diagram showing a schematic configuration of the converter control apparatus according to the sixth embodiment of the present invention. In the figure, there will be omitted the duplicate description of the components which have been already described in the above embodiments shown in FIGS. 1–3, 6, 8 and 9, by attaching the same numerals as those in the figures. In FIG. 11, function and operation are the same as those of the third embodiment with respect to a difference between the current in the primary and secondary coils in the converter 3 and a calculation of the reference value $V_{dcr}$ of the direct current component in the output voltage of the converter 3.

Moreover, there are same function and operation as those of the fifth embodiment with respect to a detection of the output voltage direct current component of the converter 3, an obtain of the correction quantity of the output voltage reference value of the converter 3 on the basis of the difference between the direct current component and the reference value $V_{dcr}$, and a suppression of the magnetic deflection of the transformer 2. In conclusion, the apparatus according to the sixth embodiment is made by combining partial components of apparatuses described in third embodiment and the fifth embodiment. According to the apparatus of the sixth embodiment, even when the irregular AC voltage is supplied to the transformer 2 to generate the constant value of the magnetic flux and the excitation current during the predetermined continuous period, since it is possible to correct not only the direct current component included in the output of the converter 3 but also the transitional direct current component occurring in the power system 1, it is possible to suppress the magnetic deflection of the transformer 2, thereby providing the converter 3 which can continuously operate without the protective stop against the over-current caused by the magnetic deflection of the transformer 2.

Figure 12:
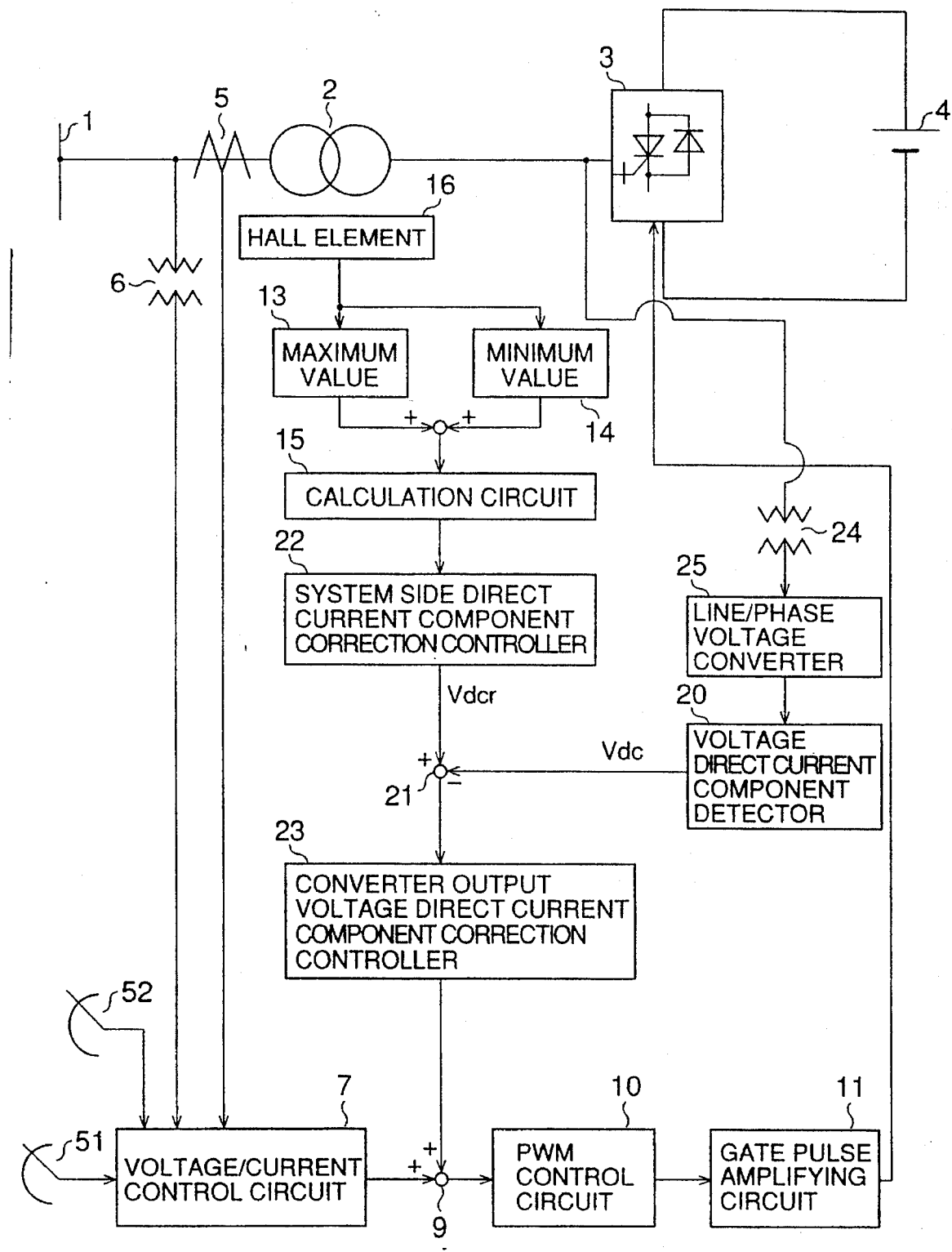
FIG. 12 is a block diagram showing a constitution of a converter control apparatus according to a seventh embodiment of the present invention.

There will be described a converter control apparatus according to a seventh embodiment of the present invention with reference to FIG. 12 which is a block diagram showing the apparatus thereof. In the figure, a description of the components having been already described in the above embodiment shown in FIGS. 1–3, 6, 8, 10 and 11, is omitted by attaching the same numerals in these figures. In FIG. 12, operation of a magnetic detector 16 detecting a magnetic flux of the iron core in the transformer 2, and function of the calculation of the reference value $V_{dcr}$ of the output voltage direct current component of the converter 3 are the same as the fourth embodiment. Furthermore, function and operation of the seventh embodiment are the same as those of the fifth embodiment with respect to a detection of the direct current component in the output voltage of the converter 3, an obtain of the correction quantity of the output voltage reference value of the converter 3 on the basis of the difference between the direct current component and the reference value $V_{dcr}$, and a suppression of the magnetic deflection of the transformer 2. In conclusion, the apparatus according to the seventh embodiment is made by combining partial components in the fourth and fifth embodiments.

By the apparatus according to the seventh embodiment, since the reference value of the direct current component of the output voltage of the converter 3 by detecting the magnetic flux of the iron core of the transformer 2, the effective control can be performed by the controlled quantity linearly corresponding to the detection quantity. Furthermore, since it is unnecessary to perform the control according to the fine changes, the normal current detector and calculation circuit can be used for the converter because the high accurate circuits are not necessary.

Furthermore, since it is possible to correct not only the direct current component included in the output of the converter 3 but also the transitional direct current component occurring in the power system 1, the magnetic deflection in the transformer 2 can not be suppressed, thereby providing the converter 3 which can continuously operate without the protective stop against the over current caused by the magnetic deflection of the transformer 2.

Figure 13:
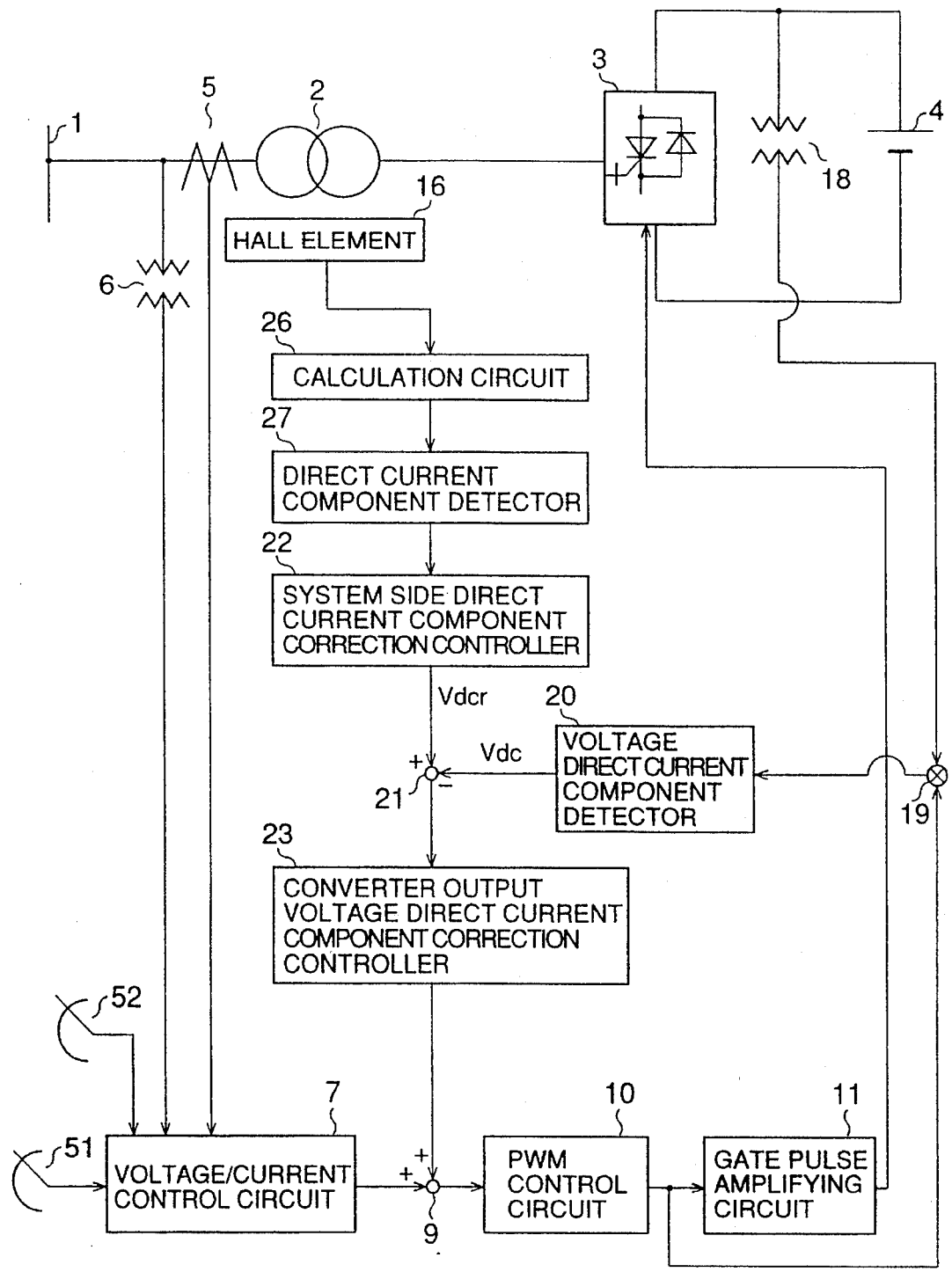
FIG. 13 is a block diagram showing a constitution of a converter control apparatus according to an eighth embodiment of the present invention.

There is described a converter control apparatus according to an eighth embodiment with reference to FIG. 13 showing the schematic configuration of the converter control apparatus according to the eighth embodiment. In the figure, the description of the components the same as those of the previous embodiments shown in FIGS. 1–3, 6, 8 and 10–12 will be omitted by attaching the same numerals in these figures because of avoiding the duplicate description. In FIG. 13, numeral 26 denotes a calculation circuit for converting a magnetic flux of the iron core in the transformer detected by the magnetic detector 16 into a signal corresponding to an excitation current, and 27 denotes a direct current component detector for detecting a direct current component of the excitation current obtained by the calculation circuit 26.

The magnetic flux $\Phi_0$ is represented by a product of the excitation current $i_0$ and the excitation inductance $X_0$ of the transformer as shown in an equation (2):

$$\Phi_0 = X_0 \cdot i_0 \quad (2).$$

Accordingly, when the magnetic flux $\Phi_0$ has been detected, the excitation current $i_0$ can be obtained by the following equation (3):

$$I_0 = \Phi_0 / X_0 \quad (3).$$

Function and operation of the eighth embodiment is the same as those of the second embodiment with respect to the detection of the direct current component of the excitation current, through the calculation of the reference value $V_{dcr}$ of the direct current component of the output voltage of the converter 3. Furthermore, there are also the same function and operation as the second embodiment with respect to the detection of the direct current component in the output voltage of the converter 3, the obtain of the correction quantity of the output voltage direct current component of the converter 3 on the basis of the difference between the actual value and reference value $V_{dcr}$, and the suppression of the magnetic deflection of the transformer 2.

By the eighth embodiment, since the magnetic flux of the iron core of the transformer 2 is detected to calculate the reference value of the direct current in the output voltage of the converter 3, an effective control can be performed by the controlled value linearly corresponding to the detection quantity. Moreover, since it is unnecessary to control the converter by the fine change, it is unnecessary to provide a specifically high accurate the current detector and calculation circuit, thereby providing the normal current detector and calculation circuit.

At last, there is described a converter control apparatus according to a ninth embodiment of the present invention. FIG. 14 is a block diagram showing the schematic configuration of the converter control apparatus according to the ninth embodiment of the present invention. In the figure, since the components attached by the same numerals as those in FIGS. 1–3, 6, 8 and 10–13 are the same components as the above embodiments, the duplicate description is omitted. In FIG. 14, function and operation are the same as the eighth embodiment, namely, the magnetic detector 16 detects the magnetic flux of the iron core in the transformer 2, and the reference value $V_{dcr}$ is calculated with respect to the direct current component in the output voltage of the converter 3. Furthermore, the function and operation are the same as the fifth embodiment that the direct current component in the output voltage of the converter 3, and the correction quantity of the output voltage reference value of the converter 3 is obtained on the basis of the difference between the actual direct current component and the reference value $V_{dcr}$. In conclusion, the apparatus according to the ninth embodiment is combined by portions of the apparatuses according to the fifth and eighth embodiments.

By the ninth embodiment, since the magnetic flux of the iron core in the transformer 2 is detected to calculate the reference value of the direct current component in the output voltage of the converter 3, the controlled quantity linearly corresponds to the detected quantity, thereby performing the effective control. Furthermore, since it is unnecessary to provide the specific high accurate current detector and calculation circuit, the normal detector and circuit can be applied as the control apparatus of the present invention.

The present invention is not limited in the above apparatuses according to the first through ninth embodiments. For example, the present invention can be applied to a converter constituted form a plurality (n numbers) of converters because the control apparatus has the same constitution even though input and output signals increase n times. Furthermore, a circuit on the direct current side is not limited to have the direct current power source, and can be applied to a power conversion apparatus on the other end represented by a direct current transmission system and a frequency conversion apparatus, or a direct current load such as a direct current motor.

What is claimed is:

1. An apparatus for controlling a converter including self-arc-extinction elements and connected between a direct current load and a power system through a transformer by a pulse width modulation (PWM) corresponding to a first reference value of an output voltage of a voltage/current control circuit: comprising first detection means for detecting a first electricity quantity necessary to obtain a deflection of a magnetic flux of an iron core of the transformer;

magnetic deflection quantity calculation means for calculating a magnetic deflection quantity as the deflection of the magnetic flux of the iron core of the transformer on the basis of the first electricity quantity detected by the first detection means;

system side direct current component calculation means for calculating a second reference value of a direct current component of an output voltage of the converter on the basis of the magnetic deflection quantity calculated by the magnetic deflection quantity calculation means;

second detection means for detecting a second electricity quantity necessary to obtain a direct current component in the output voltage of the converter;

converter side direct current component calculation means for calculating an actual value of the direct current component in the output voltage of the converter on the basis of the second electricity quantity detected by the second detection means;

difference calculation means for obtaining a difference between the second reference value of the direct current component in the output voltage of the converter calculated by the system side direct current component calculation means and the actual value of the direct current in the output voltage of the converter calculated by the converter side direct current component calculation means; and converter output direct current component correction control means for introducing a third electricity quantity for correcting the output voltage of the converter on the basis of the difference between the second reference value and the actual value with respect to the direct current component in the output voltage of the converter obtained by the difference calculation means.

2. The apparatus for controlling the converter, as set forth in claim 1; wherein a converter control apparatus comprises a direct current component detector for detecting a direct current component included in a difference between current of a primary coil and a secondary coil of a transformer;

a system side direct current component correction controller for calculating a reference value of the direct current component in an output voltage of the converter on the basis of the detected direct current component;

a multiplier for calculating an output voltage of the converter on the basis of a DC voltage of the converter and a gate pulse pattern for controlling the converter;

a voltage direct current component detector for detecting a voltage direct current component included in the output voltage of a multiplied result; and a converter output direct current component correction controller for correcting the output voltage of the converter on the basis of a difference between the detected voltage direct current component and the reference value of the output voltage direct current component.

3. The apparatus for controlling the converter, as set forth in claim 1; wherein a converter control apparatus comprises;

a maximum value detection circuit and a minimum value detection circuit for respectively detecting a maximum value and a minimum value of a difference between current of a primary coil and a secondary coil in a transformer;

a calculation circuit for calculating a center value of a magnetic flux on the basis of the maximum value and the minimum value and a magnetic saturation characteristic of an iron core in the transformer;

a system side direct current component correction controller for calculating a reference value of the direct current component in the output voltage of the converter on the basis of the detected center value of the magnetic flux;

a multiplier for calculating the output value of the converter on the basis of the DC current of the converter and a gate pulse pattern for controlling the converter, a voltage direct current component detector for detecting a voltage direct current component included in the output voltage of a multiplied result; and a converter output direct current component correction controller for correcting the output voltage of the converter on the basis of a difference between the detected voltage direct current component and the reference value of the output voltage direct current component.

4. The apparatus for controlling the converter, as set forth in claim 1; wherein a converter control apparatus comprises means for detecting a magnetic flux of an iron core in a transformer;

a maximum value detection circuit for detecting a maximum value of the magnetic flux of the iron core in the transformer;

a minimum value detection circuit for detecting minimum value of the magnetic flux of the iron core in the transformer;

a calculation circuit for calculating a center value of the magnetic flux on the basis of the maximum value and the minimum value;

a system side direct current component correction controller for calculating a reference value of the direct current component in the output voltage of the converter on the basis of the detected center value of the magnetic flux;

a multiplier for calculating the output value of the converter on the basis of the DC current of the converter and a gate pulse pattern for controlling the converter;

a voltage direct current component detector for detecting a voltage direct current component included in the output voltage of a multiplied result; and a converter output direct current component correction controller for correcting the output voltage of the converter on the basis of a difference between the detected voltage direct current component and the reference value of the output voltage direct current component.

5. The apparatus for controlling the converter, as set forth in claim 1; wherein a converter control apparatus comprises a direct current component detector for detecting a direct current component included in a difference between current of primary and secondary coils of a transformer;

a system side direct current component correction controller for calculating a reference value of a direct current component of an output voltage of the converter on the basis of a detected direct current component;

a line/phase voltage converter for calculating an output phase voltage from an output line voltage detected from the converter;

a voltage direct current component detector for detecting a voltage direct current component included in the output phase voltage; and a converter output direct current component correction controller for correcting the output voltage of the converter on the basis of a difference between a reference value of the output voltage direct current component and the detected voltage direct current component.

6. The apparatus for controlling the converter, as set forth in claim 1; wherein a converter control apparatus comprises a maximum value detection circuit for detecting a maximum value of a difference between current of a primary coil and a secondary coil in a transformer;

a minimum value detection circuit for detecting a minimum value of the difference between current of the primary coil and the secondary coil in the transformer;

a calculation circuit for calculating a center value of a magnetic flux on the basis of the maximum value and the minimum value and a magnetic saturation characteristic of an iron core in the transformer;

a system side direct current component correction controller for calculating a reference value of the direct current component in the output voltage of the converter on the basis of the detected center value of the magnetic flux;

a multiplier for calculating the output value of the converter on the basis of the DC current of the converter and a gate pulse pattern for controlling the converter;

a line/phase voltage converter for calculating an output phase voltage from an output line voltage detected from the converter;

a voltage direct current component detector for detecting a voltage direct current component included in the output phase voltage; and a converter output direct current component correction controller for correcting the output voltage of the converter on the basis of a difference between a reference value of the output voltage direct current component and the detected voltage direct current component.

7. The apparatus for controlling the converter, as set forth in claim 1; wherein a converter control apparatus comprises means for detecting a magnetic flux of an iron core in a transformer;

a maximum value detection circuit for detecting a maximum value of the magnetic flux of the iron core in the transformer;

a minimum value detection circuit for detecting a minimum value of the magnetic flux of the iron core in the transformer;

a calculation circuit for calculating a center value of the magnetic flux on the basis of the maximum value and the minimum value;

a system side direct current component correction controller for calculating a reference value of the direct current component in the output voltage of the converter on the basis of the detected center value;

a line/phase voltage converter for calculating an output phase voltage from an output line voltage detected from the converter;

a voltage direct current component detector for detecting a voltage direct current component included in the output phase voltage; and a converter output direct current component correction controller for correcting the output voltage of the converter on the basis of a difference between a reference value of the output voltage direct current component and the detected voltage direct current component.

8. The apparatus for controlling the converter, as set forth in claim 1; wherein a converter control apparatus comprises means for detecting a magnetic flux;

a direct current component detector for detecting a direct current component on the basis of the magnetic flux;

a system side direct current component correction controller for calculating a reference value of the direct current component in the output voltage of the converter on the basis of the detected direct current;

a multiplier for calculating the output voltage of the converter on the basis of a DC voltage of the converter and a gate pulse for controlling the converter;

a voltage direct current component detector for detecting a voltage direct current component included in a multiplied result; and a converter output direct current correction controller for correcting the output voltage of the converter on the basis of a difference between a reference value of the output voltage direct current component and the detected voltage direct current component.

9. The apparatus for controlling the converter, as set forth in claim 1; wherein a converter control apparatus comprises means for detecting a magnetic flux of a core of a transformer;

a direct current component detector for detecting a direct current component in the magnetic flux;

a system side direct current component correction controller for calculating a reference value of the direct current component in the output voltage of the converter on the basis of the detected direct current;

a line/phase voltage converter for calculating an output phase voltage on the basis of a output line voltage detected from the converter;

a voltage direct current component detector for detecting a voltage direct current component included in the output phase voltage; and a converter output voltage direct current component correction controller for correcting the output voltage of the converter on the basis of a difference between the detected voltage direct current component and the reference value of the output voltage direct current component.

* * * * *